United States Patent
Grimsdale (10) Patent No.: US 9,625,597 B2
(45) Date of Patent: Apr. 18, 2017

(54) ACOUSTIC MODEM-BASED GUIDING METHOD FOR AUTONOMOUS UNDERWATER VEHICLE FOR MARINE SEISMIC SURVEYS

(71) Applicant: CGG SERVICES SA, Massy (FR)

(72) Inventor: Jonathan Grimsdale, Orsay (FR)

(73) Assignee: CGG SERVICES SAS, Massy (FR)

( * ) Notice: Subject to any disclaimer, the term of this patent is extended or adjusted under 35 U.S.C. 154(b) by 0 days.

(21) Appl. No.: 14/440,241

(22) PCT Filed: Dec. 17, 2013

(86) PCT No.: PCT/EP2013/076890
§ 371 (c)(1),
(2) Date: May 1, 2015

(87) PCT Pub. No.: WO2014/095854
PCT Pub. Date: Jun. 26, 2014

(65) Prior Publication Data
US 2015/0276959 A1 Oct. 1, 2015

(30) Foreign Application Priority Data
Dec. 20, 2012 (FR) .................................. 12 62458

(51) Int. Cl.
*G01V 1/38* (2006.01)
*G01V 1/24* (2006.01)
(Continued)

(52) U.S. Cl.
CPC ........... *G01V 1/3852* (2013.01); *B63G 8/001* (2013.01); *B63G 8/08* (2013.01); *G01C 21/00* (2013.01);
(Continued)

(58) Field of Classification Search
CPC ...... G01V 1/3835; G01V 1/3808; G01V 1/24; G01V 1/22; G01V 1/16; G01V 1/3852;
(Continued)

(56) References Cited

U.S. PATENT DOCUMENTS 5,119,341 A 6/1992 Youngberg
5,579,285 A 11/1996 Hubert
(Continued)

FOREIGN PATENT DOCUMENTS

CN 102052924 A 5/2011
FR 2643463 A1 8/1990
(Continued)

OTHER PUBLICATIONS

International Search Report in related International Application No. PCT/EP2013/076890, mailed Mar. 21, 2014.
(Continued)

*Primary Examiner* — Russell Frejd
(74) *Attorney, Agent, or Firm* — Patent Portfolio Builders PLLC (57) ABSTRACT

An autonomous underwater vehicle (AUV) records seismic signals during a marine seismic survey. The AUV includes a communication device configured to acoustically receive location information from plural transducers of a vessel, wherein each transducer of the vessel transmits its own geographical location; a navigation system configured to receive the location information from the communication device and to calculate current and target positions of the AUV; a propulsion system configured to drive the AUV from the current position to the target position; and a seismic sensor for recording seismic data after reaching a final target position.

20 Claims, 8 Drawing Sheets

(51) Int. Cl.
*G01V 1/22* (2006.01)
*G01V 1/16* (2006.01)
*G05D 1/06* (2006.01)
*B63G 8/00* (2006.01)
*B63G 8/08* (2006.01)
*G01S 19/13* (2010.01)
*G01C 21/00* (2006.01)

(52) U.S. Cl.
CPC .............. *G01S 19/13* (2013.01); *G01V 1/16* (2013.01); *G01V 1/22* (2013.01); *G01V 1/24* (2013.01); *G01V 1/3808* (2013.01); *G01V 1/3835* (2013.01); *G05D 1/0692* (2013.01); *B63G 2008/004* (2013.01); *B63G 2008/005* (2013.01)

(58) Field of Classification Search
CPC ........ G05D 1/0692; B63G 8/001; B63G 8/08; B63G 2008/005; B63G 2008/004; G01S 19/13; G01C 21/00
See application file for complete search history.

(56) References Cited

U.S. PATENT DOCUMENTS

| | | | |
|---|---|---|---|
| 5,758,592 A * | 6/1998 | Benson, Jr. | B63G 8/16 114/151 |
| 6,779,475 B1 * | 8/2004 | Crane | B63B 27/10 114/258 |
| 7,362,653 B2 | 4/2008 | Green et al. | |
| 8,009,516 B2 | 8/2011 | Crowell | |
| 8,093,539 B2 | 1/2012 | Rastegar | |
| 8,717,844 B2 * | 5/2014 | Welker | B63B 27/36 181/122 |
| 2010/0295720 A1 | 11/2010 | Rastegar | |
| 2010/0302901 A1 | 12/2010 | Welker et al. | |

FOREIGN PATENT DOCUMENTS

| | | |
|---|---|---|
| JP | 2006119149 A | 5/2006 |
| KR | 20080085509 A | 9/2008 |

OTHER PUBLICATIONS

Written Opinion of the International Searching Authority in related International Application No. PCT/EP2013/076890, mailed Mar. 21, 2014.

* cited by examiner

ACOUSTIC MODEM-BASED GUIDING METHOD FOR AUTONOMOUS UNDERWATER VEHICLE FOR MARINE SEISMIC SURVEYS

BACKGROUND

Technical Field

Embodiments of the subject matter disclosed herein generally relate to methods and systems and, more particularly, to mechanisms and techniques for performing a marine seismic survey using autonomous underwater vehicles (AUVs) that carry appropriate seismic sensors and use an acoustic modem to communicate with a vessel for arriving at a target location on the ocean floor.

Discussion of the Background

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, providing a high-resolution image of geophysical structures under the seafloor is an ongoing process.

Reflection seismology is a method of geophysical exploration to determine the properties of earth's subsurface, which is especially helpful in determining the above-noted reservoirs. Marine reflection seismology is based on using a controlled source of energy that sends energy into the earth. By measuring the time it takes for the reflections and/or refractions to come back to plural receivers, it is possible to evaluate the depth of features causing such reflections. These features may be associated with subterranean hydrocarbon deposits.

Figure 1:
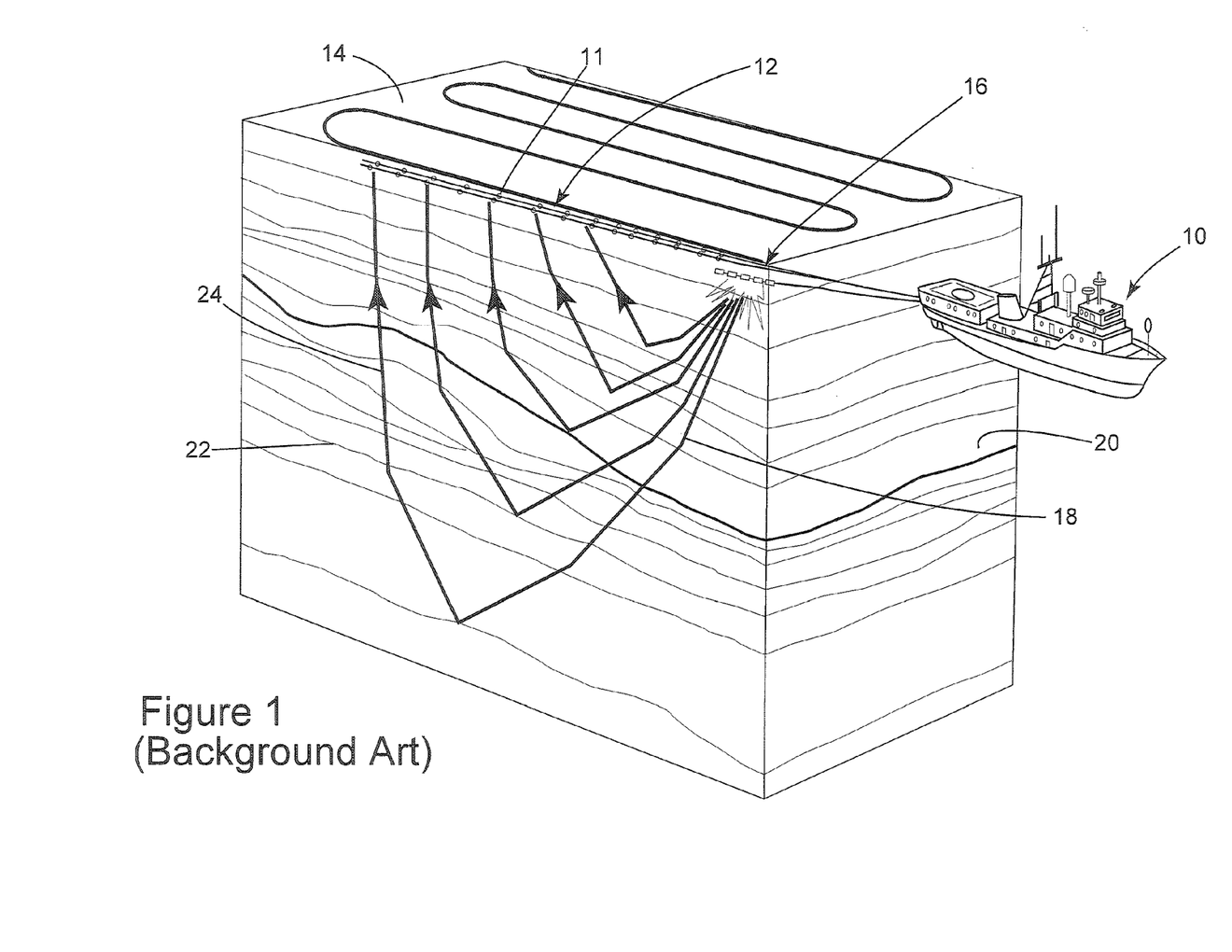
FIG. 1 is a schematic diagram of a conventional seismic survey system.

A traditional system for generating seismic waves and recording their reflections off the geological structures present in the subsurface is illustrated in FIG. 1. A vessel 10 tows an array of seismic receivers 11 provided on streamers 12. The streamers may be disposed horizontally, i.e., lying at a constant depth relative to the ocean surface 14, or they may have other spatial arrangements. The vessel 10 also tows a seismic source array 16 configured to generate a seismic wave 18. The seismic wave 18 propagates downward toward the seafloor 20 and penetrates it until a reflecting structure 22 (reflector) eventually reflects the seismic wave. The reflected seismic wave 24 propagates upward until it is detected by the receiver(s) 11 on the streamer(s) 12. Based on the data collected by the receiver(s) 11, an image of the subsurface is generated.

However, this traditional configuration is expensive because the cost of streamers is high. New technologies deploy plural seismic sensors on the bottom of the ocean (ocean bottom stations) to improve the coupling. Even so, positioning seismic sensors remains a challenge.

A new technology employs probes that are launched from a vessel and, by virtue of gravity, travel to the ocean bottom. However, these probes do not possess an active navigation system and, thus, the landing accuracy is poor, i.e., the probes do not land at the intended location. This inaccuracy in the association of the recorded seismic data with the probe's geographical location propagates to the processing stage, resulting in a degraded image of the subsurface being surveyed. Another disadvantage of this technology is that the probes leave behind corresponding pedestals when they are instructed to resurface, which are heavy pieces of equipment that make good contact with the ocean floor. This contributes to ocean pollution, which is undesirable.

Accordingly, it would be advantageous to provide inexpensive and non-polluting systems, methods and devices for reaching the seafloor, recording seismic waves and resurfacing for data transfer.

SUMMARY

According to one exemplary embodiment, there is an autonomous underwater vehicle (AUV) for recording seismic signals during a marine seismic survey. The AUV includes a communication device configured to acoustically receive location information from plural transducers of a vessel, wherein each transducer of the vessel transmits its own geographical location; a navigation system configured to receive the location information from the communication device and to calculate current and target positions of the AUV; a propulsion system configured to drive the AUV from the current position to the target position; and a seismic sensor for recording seismic data after reaching a final target position.

According to another exemplary embodiment, there is a seismic system for performing a seismic survey. The seismic system includes a vessel having plural transducers configured to send location information in the water; and at least one autonomous underwater vehicle (AUV) for recording seismic signals during the marine seismic survey. The at least one AUV includes a communication device configured to acoustically receive the location information from the plural transducers of the vessel, wherein each transducer of the vessel transmits its own geographical location, a navigation system configured to receive the location information from the communication device and to calculate current and target positions of the AUV, a propulsion system configured to drive the AUV from the current position to the target position, and a seismic sensor for recording seismic data after reaching a final target position.

According to yet another exemplary embodiment, there is a method for guiding an autonomous underwater vehicle (AUV) to a final target on the sea floor. The method includes a step of releasing from a vessel the AUV in the water; a step of using a navigation system to guide the AUV from a current position to a target position; a step of receiving at a communication device of the AUV, while traveling from the current position to the target position, location information from plural transducers mounted on a vessel, wherein the location information is related to a location of the vessel; a step of calculating with a processor, based on the location information, an updated current position of the AUV; a step of using the navigation system and the updated current position to calculate a new target position of the AUV; and a step of guiding the AUV to the new target position.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of an AUV having seismic sensors and an acoustic modem for exchanging location information with a mother vessel. However, the embodiments to be discussed next are not limited to AUVs deployed from a vessel, but they may be applied to other platforms (e.g., glider, buoy, etc.) that may include seismic sensors.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Emerging technologies in marine seismic surveys need an inexpensive system for deploying and recovering seismic receivers in the water. According to an exemplary embodiment, such a seismic system includes plural AUVs, each having one or more seismic sensors, which may be one of a hydrophone, geophone, accelerometer, electromagnetic sensor, etc. If an electromagnetic sensor is used, then a source that emits electromagnetic waves may be used instead of, or in addition to, an acoustic source.

A new technology employs plural autonomous underwater vehicles (AUVs), each carrying a seismic sensor (e.g., a 4C seismic sensor) and each traveling toward a desired target position on the ocean bottom (see, for example, patent Ser. No. 13/616,396, Deployment and Recovery of Autonomous Underwater Vehicles for Seismic Survey, filed on Sep. 14, 2012; patent Ser. No. 13/616,481, Autonomous Underwater Vehicle for Marine Seismic Surveys, filed on Sep. 14, 2012; and patent Ser. No. 13/616,327, Deployment and Recovery Vessel for Autonomous Underwater Vehicle for Seismic Survey, all assigned to the assignee of this patent application and the content of all of them being incorporated herein by reference). After arriving at the desired target position, the seismic sensor records seismic signals generated by one or more sources. When the recording phase is over, the AUV may be instructed to surface, and it is collected by a recovery vessel for maintenance and seismic data transfer.

The AUV may be specially designed or an off-the-shelf device so that it is inexpensive. The off-the-shelf device may be quickly retrofitted or modified to include the seismic sensors and necessary communications means to be discussed later. The AUV may include, besides or in addition, a propulsion system and a buoyancy system. A deployment vessel may store the AUVs and launch them as necessary for the seismic survey. The AUVs find their target positions using, for example, location information received from a combination of sources, e.g., from transducers on a deployment or recovery vessel, from an inertial measurement unit on the AUV, or other means. These aspects are discussed in more detail later. In the following, reference is made to a deployment vessel and/or a recovery vessel. Note that these vessels may be identical from an equipment point of view. However, the vessels may be operated as a recovery vessel or as a deployment vessel. In other words, a recovery vessel may be instructed, after having enough AUVs on board, to become a deployment vessel, and vice versa. When the document refers to a vessel, it might be the recovery vessel, the deployment vessel or both of them.

As the deployment vessel is launching the AUVs, a shooting vessel may follow the deployment vessel to generate seismic waves. The shooting vessel may tow one or more seismic source arrays, which may include plural individual seismic sources that may be arranged on a horizontal line, a slanted line or a curved line (e.g., a parameterized curved line) under water. An individual seismic source may be an air gun, a vibrational source or other known seismic sources. The shooting vessel or another vessel, e.g., the recovering vessel, may then instruct selected AUVs to resurface so they can be collected. In one embodiment, the deployment vessel also tows source arrays and shoots them as it deploys the AUVs. In still another exemplary embodiment, only the deployment vessel is configured to retrieve the AUVs. However, it is possible that only the shooting vessel is configured to retrieve the AUVs. Alternatively, a dedicated recovery vessel may wake up the AUVs and instruct them to return to the surface for recovery.

In one exemplary embodiment, the AUVs number in the thousands. Thus, the deployment vessel is configured to hold all of them at the beginning of the seismic survey and to launch them as the survey is advancing. If the shooting vessel is configured to retrieve the AUVs, when the number of available AUVs on the deployment vessel falls below a predetermined threshold, the shooting and deployment vessels are instructed to switch positions in the middle of the seismic survey. If a dedicated recovery vessel is used to recover the AUVs, then the deployment vessel is configured to switch positions with the recovery vessel when the deployment vessel becomes empty. In another exemplary embodiment, both vessels are full of AUVs. The first one starts deploying the AUVs and the second one just follows the first one. Once the first one has deployed most or all of the AUVs, this vessel becomes the recovery vessel and the second one starts deploying AUVs, thus becoming the deployment vessel. Later, the two vessels may switch functions as necessary.

In an exemplary embodiment, the seismic survey is performed as a combination of seismic sensors of the AUVs and seismic sensors of streamers towed by the deployment vessel, the shooting vessel or both of them.

In still another exemplary embodiment, when selected AUVs are instructed to surface, they may be programmed to go to a desired rendezvous point where they will be collected by the shooting vessel, the deployment vessel or the recovery vessel. The selected AUVs may be chosen to belong to a given row or column, if a row and column arrangement is used. The shooting and/or deployment or recovery vessel may be configured to send acoustic signals to the returning AUVs to guide them to the desired position. The AUVs may be configured to rise to a given altitude, execute the return path at that altitude, and then surface to be recovered. In one exemplary embodiment, the AUVs are configured to communicate among themselves so they follow each other in their path back to the recovery vessel, or they communicate among themselves to establish a queue to be retrieved by the shooting or recovery or deployment vessel.

Once on the vessel, the AUVs are checked for problems, their batteries may be recharged or replaced, and the stored seismic data may be transferred to the vessel for processing. Alternatively or in addition, a compressed gas tank may be replaced or recharged to power the AUVs' buoyancy system. The recovery vessel may store the AUVs on deck during the maintenance phase or somewhere inside the vessel, e.g., inside a module, closed or open, that is fixed on the vessel or the vessel's deck. A conveyor-type mechanism may be designed to recover the AUVs on one side of the vessel when it is used as a recovery vessel, and to launch the AUVs from the other side when the vessel is used as a deployment vessel. After maintenance, the AUVs are again deployed as the seismic survey continues. Thus, in one exemplary embodiment the AUVs are continuously deployed and retrieved. In still another exemplary embodiment, the AUVs are configured to not transmit the seismic data to the deployment, recovery or shooting vessel while performing the seismic survey. This may be advantageous because the AUVs' electric power may be limited. In another exemplary embodiment, each AUV has enough electric power (stored in the battery) to be deployed only once, record seismic data and resurface for retrieval. Thus, reducing data transmission volume between the AUV and the vessel while the AUV is underwater conserves power and allows the AUV to be retrieved on the vessel before it runs out of power.

Figure 2:
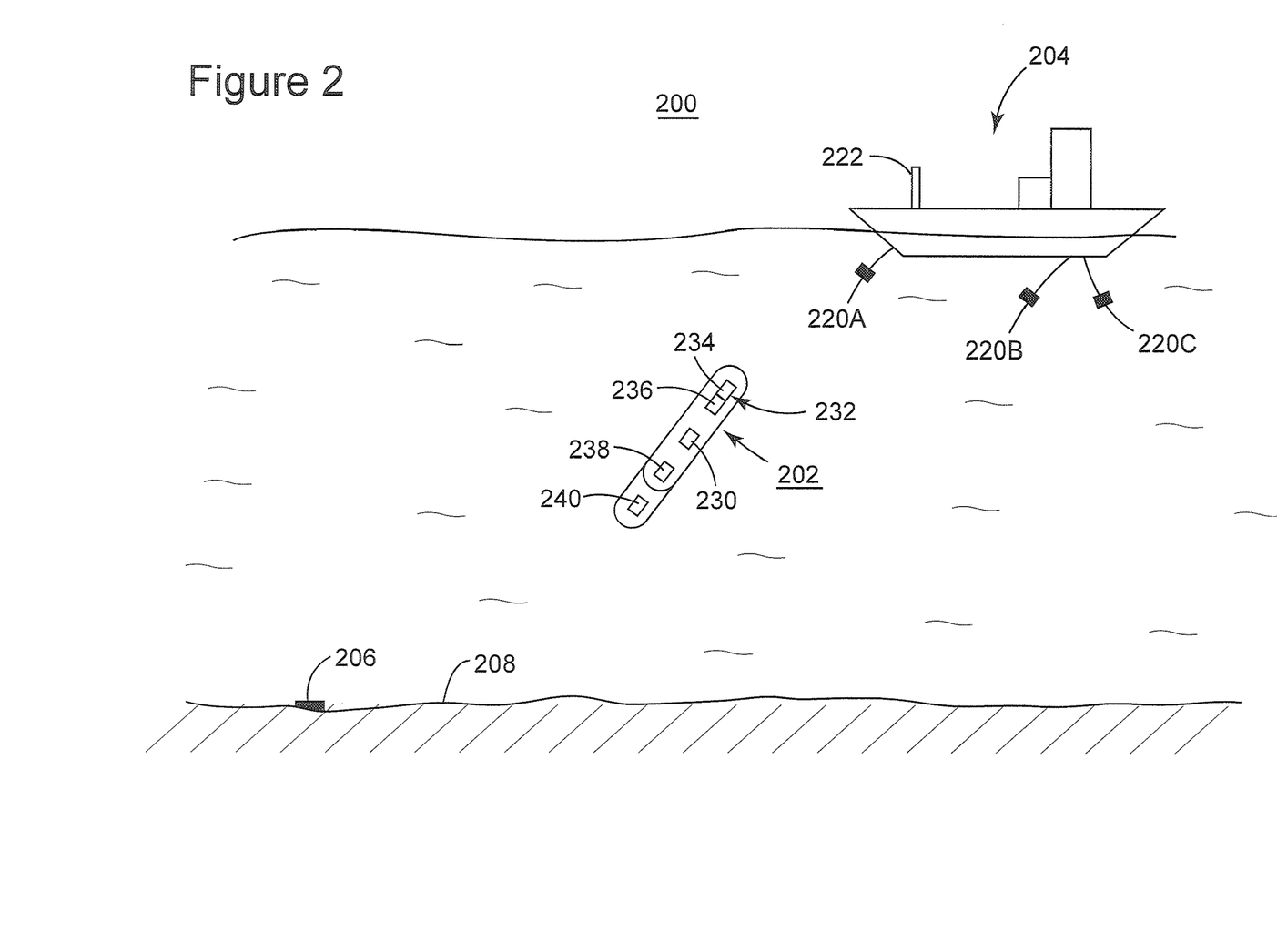
FIG. 2 is a schematic diagram of an AUV, including an acoustic modem according to an exemplary embodiment.

The above-noted embodiments are now discussed in more detail with regard to the figures. FIG. 2 illustrates a system 200 that includes at least one AUV 202 and a vessel 204. Details about the AUV 202 have been disclosed in the patent applications noted above. Other configurations for the AUV 202 may be used. The AUV 202 aims to arrive at a desired target position 206 on the ocean bottom 208. In the following, a novel system for guiding the AUV 202 to the target position 206 is discussed.

The vessel 204 may include three transducers 220A-C located on its exterior. For example, a first transducer 220A may be located on or around the bow of the vessel, and the second and third transducers 220B and 220C may be located on the stern, e.g., on each side of the stern so that the three transducers form a triangle. The triangle has its base at the stern and the top at the bow. In one embodiment, each vessel (deployment, recovery, shooting) has this transducer configuration. The transducers are mounted underwater, deep enough to minimize the effect of water flow around the vessel.

Each transducer may be configured to emit a message. In one application, the length of the message is about 500 ms. Other time lengths may be used. The transducers are configured to emit their messages sequentially, i.e., the first transducer emits a first message, after a given time gap, e.g., 500 ms, the second transducer emits a second message, after another time gap, the third transducer emits a third message, and so on. Thus, in one application, any of the transducers emits a message every 3 s. The given time gap is selected to avoid contamination with multiple arrivals.

A message may include location information as discussed next. The message may include the geographical location of the transducer that emits that message. For example, the vessel 204 may include a Global Positioning System (GPS) 222. In one application, the system 222 may be a Real Time Kinematic (RTK) GPS. The RTK GPS uses measurements of the phase of the signal's carrier wave, rather than the information content of the signal, and relies on a single reference station to provide real-time corrections, improving accuracy.

The position of the GPS 222 may be projected to the location of each transducer for improved accuracy, i.e., the distances between the locations of the GPS 222 and the transducers 220A-C are taken into account to provide each transducer's exact location. The position of the transducers may also be extrapolated in time, i.e., what position the transducer will have at a time calculated as the current time plus 250 ms (i.e., half the time length of the message). The location information may be encoded, for example, using 100 bits. Other schemes may be used as will be recognized by those skilled in the art. In one embodiment, the location information includes the X, Y and Z positions (Cartesian location) of the transducer. In another application, the position of the transducer in polar or spherical coordinates may be provided to the AUV. The reference points for the Cartesian or polar or spherical system of coordinates may be linked to the position of the vessel, or to another convenient reference point. The message may be modulated in a secure mode and may use a frequency band from 10 to 14 KHz. The range of the signal may be around 2.7 km. Other frequencies may be used as desired.

Next, the AUV's configuration (with regard to communication and position guidance) is discussed. The AUV may include an inertial measurement unit (IMU) 230. An IMU may include at least a module containing accelerometers, gyroscopes or other motion-sensing devices. The AUV further includes a communication device 232 configured to receive the messages (signals) emitted by the transducers 220A-C. The communication device 232 may include an acoustic modem 234 that receives the messages, and an electronic part 236 (e.g., a processor) configured to demodulate the messages, extract the transducers' location information and calculate the real position of the AUV. The AUV may also include a compass 238 and a clock 240 for providing support to the IMU and/or the electronic part 236.

Before being launched, the AUV 202 has its clock 240 synchronized with the vessel, and the electronic part and IMU are programmed with the desired target destination. Also, the actual position of the AUV is loaded. The desired target destination may be provided in the same coordinate system as the vessel. The initial trajectory may also be supplied to the AUV in terms of bearings that it should follow immediately after release. Note that this initial trajectory is intended to be used only for the first few seconds until the AUV is able to receive the messages from the transducers and then to calculate its real position.

After being released in the water, the AUV may use its compass and the IMU to start an approximate route toward its target destination. The AUV may navigate at a constant speed, e.g., 4 knots. The AUV is configured to now listen to the messages from the transducers of the deploying vessel. If the transducers are configured to emit 500 ms long messages with 500 ms gaps, the AUV is expected to receive, after about 4 s, three messages, one from each transducer of the vessel 204. Based on this data, the AUV is now capable of determining its real position using, for example, triangulation. In one application, the AUV stores and uses a velocity model for the water layer between itself and the vessel. In other words, because the speed of sound in water changes as the depth changes, the sound velocity model describes this correlation, and the electronic part 236 of the AUV may use it to account for curved ray paths and more accurately determine its real position.

Thereafter, the AUV may calculate its new position every 3 s (or another time if messages with different time lengths or different time gaps are used), and it may adjust its trajectory toward the ocean bottom based on these real positions.

If the water currents are strong or there is a collision with an object (e.g., debris, fish, etc.), it is desired to achieve a sufficiently high sampling rate of the position and velocity by the electronic part of the AUV so that its control loop is quickly updated. The same is true when the AUV approaches its target position. In one embodiment, the sample rate may be dynamically changed by the control implemented in the AUV, i.e., high sampling rate at low depths (i.e., after being launched) and depths close to the final position.

The information determined by the electronic part of the AUV may be combined with information from the IMU and/or pressure gauge to update the current position and derivatives (vectors of velocity and acceleration) of the AUV with a sufficiently high sampling rate. Note that the IMU may track information related to roll, pitch and yaw.

When the AUV has landed on the seafloor, its electronic part continues to listen and triangulate the signals coming from the vessel to improve the accuracy of its final position. In other words, the AUV may not have, immediately after landing, accurate information about its own final position. For this reason, the AUV continues to listen to the signals from the vessel and continues to calculate its final position. Note that the vessel may be not only the launching vessel, but, for example, the recovery vessel or the shooting vessel or another vessel. In one application, after the AUV has determined that its final position is not changing in a given time period, the AUV concludes that it has achieved its final position and uses this position to associate with the seismic data to be collected. Thus, in this situation, there is no need to measure the AUV position from the vessel. At this time, the electronic part of the AUV may stop activities related to determining its final position, e.g., stop listening to the transducers signals. The calculated final position is then stored in a storage device.

A few practical considerations are now discussed with regard to the AUVs. Note that these considerations are not intended to limit the above-discussed embodiments or the applicability of the novel concepts disclosed herein, but only to give the reader some concrete examples about possible implementations of the novel methods.

Regarding the signal length, it was noted in one exemplary embodiment that the signal may last 500 ms. Thus, even if the demodulation and correlation time is small, there will be a delay of 500 ms between the time the AUV receives the start of a signal and the time at which it will know its position. During that time, the AUV will have moved about 1 m. During transmission, the vessel will also have moved about 1 m. Thus, vessel movement can be mitigated by extrapolating its position to 250 ms after the start of the emission.

With regard to the accuracy of triangulation, according to an exemplary embodiment, the transducers may be placed on a triangle of base 16 m and height about 60 m. The signal-to-noise ratio of the acoustic signal is desired to be high in order to ensure reliable decoding of positions and accurate measurement of the signal arrival times. A high amplitude signal can be used because the frequency range will not be close to other frequencies used by the crew (e.g., source position). Further, the positions of the transducers need to be designed, if possible, to not degrade the signal-to-noise ratio. For example, there will be a tradeoff between keeping the transducers away from the vessel for less noise, and keeping them close to the vessel to avoid amplifying GPS errors by projection of the vessel attitude and position.

The Doppler effect on the modulated signal needs to be considered. The modulation's secure mode discussed above can handle relative velocities of up to 5 m/s. The vessel and AUV are not expected to travel in exactly opposite directions, so relative velocity will likely always be less than about 4.5 m/s.

Accuracy of measurement of the signal arrival time is another practical matter to be considered. Accuracy of signal travel time will depend on the accuracy of clock synchronization and on the accuracy with which the arrival of the modem signal can be situated in time.

Figure 3:
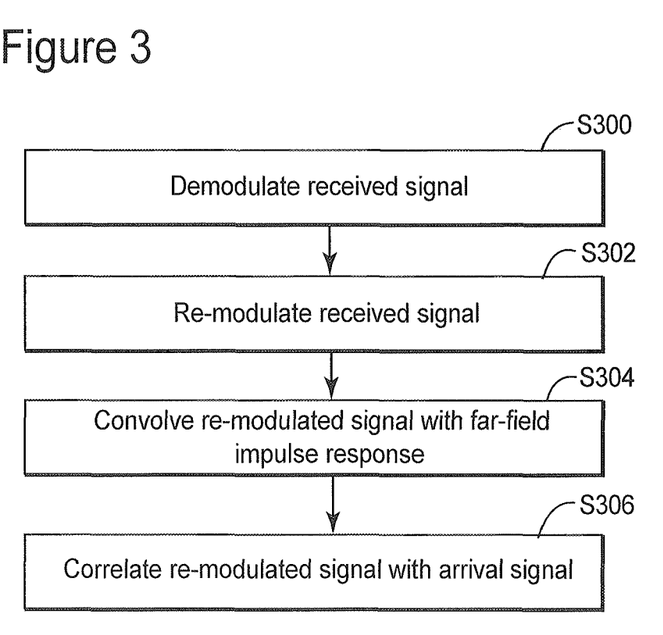
FIG. 3 if a flowchart of a method for improving the accuracy of a measurement of a modulated signal's arrival time at the AUV according to an exemplary embodiment.

Accuracy of the measurement of the modulated signal arrival time is mainly a function of signal-to-noise ratio and distortion due to Doppler effects. High accuracy could be achieved, for instance by following the process illustrated in FIG. 3: in step 300, demodulate, in the AUV, the received signal. In step 302, re-modulate the received signal. In step 304, convolve the re-modulated signal with the far-field impulse response of the emitting transducer. In step 306, correlate this re-modulated signal with the arrival signal. If required, it would be possible to compensate for Doppler effects by measuring derivatives of the AUV and transducer positions. An accuracy of better than ¼ cycle, i.e., 25 microseconds at 10 KHz, resulting in an accuracy of around 4 cms, should be achievable with the embodiments discussed above.

The accuracy of the AUV's clock is another matter to be considered. The AUV's clock is synchronized before launching. Considering a cruising speed of about 4 knots, the AUV should arrive at its landing position in well under 300 s. Due to this short traveling time, the AUV requires no sophisticated clock.

If the AUV is able to determine its position after landing to within +/−2 m, then it can use that information and the acoustic signals from, for example, the recovery vessel, to reset its clock before it starts its return journey. This action will help it know its distance from the vessel as it approaches, and improve the reliability of the recovery navigation. In other words, the recovery process may be able to use a navigation scheme similar to the deployment process discussed above. In one application, the recovery process would require a switch of frequency bands to avoid interference with the deployment vessel on the other side of the spread. That in turn may require a different receiver array.

Multiple arrivals is still another matter to be considered. The assumption is that successive signals will be separated by enough time for the multiple arrivals to have been attenuated sufficiently so that successive signals do not interfere with each other. Shorter period multiples should be eliminated by the secure modulation scheme.

Still another matter to be considered is the accuracy of acoustic travel distance. Calculation of the triangulation distances from travel times may be affected by currents and acoustic velocity variations, causing ray path and rms velocity distortions. It may be possible to mitigate these distortions by using a survey-wide velocity gradient and a current gradient (1-D or 2-D, etc).

According to another embodiment, if currents and water temperature gradients cause too much inaccuracy in the ray paths, the AUV could wait until the vessel returns on its next deployment line, and measure the travel times from "the opposite side." This will help "cancel out" these distortions if they have a cause that is 1D and constant in time.

The AUV may need to be decelerated when it is close to or reaches its final target. However, decelerating an AUV is not a straightforward process. Just relying on a collision course with the seafloor, like a dart in a dart board, will probably not be good enough. Further, the position update rate from acoustics might be insufficient to ensure a controlled landing. An effective and robust algorithm to "fuse" information from acoustics, IMU, compass, pressure gauge and, perhaps, echo sounder may be necessary.

Figure 4:
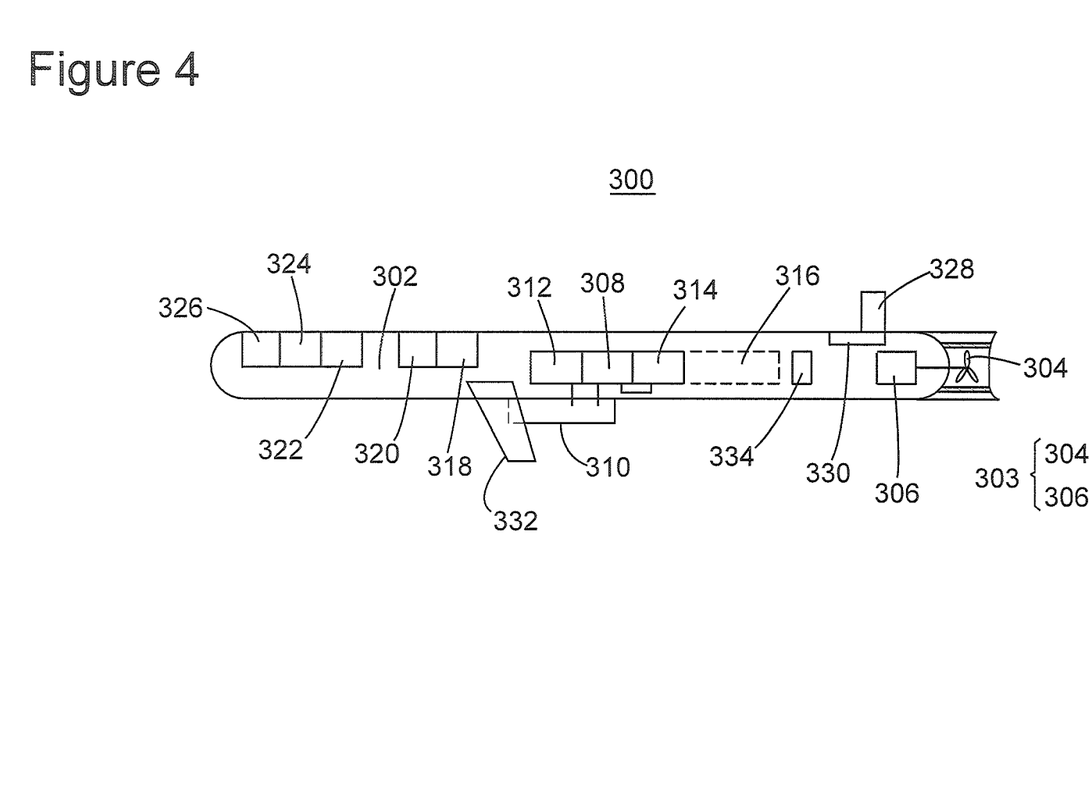
FIG. 4 is a schematic diagram of an AUV.

An exemplary AUV is now discussed with regard to FIG. 4. An AUV 300 has a body 302 in which a propulsion system 303 may be located. The propulsion system 303 may include one or more propellers 304 and a motor 306 for activating the propellers 304. Alternatively, the propulsion system may include one or more turbines. The motor 306 may be controlled by a processor 308. The processor 308 may also be connected to a seismic sensor 310. The seismic sensor 310 may have a shape such that when the AUV lands on the seabed, the seismic sensor achieves a good coupling with seabed sediment. The seismic sensor may include one or more of a hydrophone, geophone, accelerometer, etc. For example, if a 4C (four component) survey is desired, the seismic sensor 310 includes three accelerometers and a hydrophone, i.e., a total of four sensors. Alternatively, the seismic sensor may include three geophones and a hydrophone. Of course, other combinations of sensors are possible.

A memory unit 312 may be connected to the processor 308 and/or the seismic sensor 310 for storing seismic data it records and other information as necessary. A battery 314 may be used to power all these components, and it may be allowed to change its position along a track 316 to change the AUV's center of gravity.

The AUV may also include an inertial measurement unit (IMU) 318 configured to guide the AUV to a desired location. The IMU may include at least a module containing accelerometers, gyroscopes or other motion-sensing devices. The IMU is initially provided with the current position and velocity of the AUV from another source, for example, a human operator, a GPS satellite receiver, another IMU from the vessel, etc., and thereafter, the IMU computes its own updated position and velocity by integrating (and optionally filtering) information received from its motion sensors and/or information from the transducers of the vessel.

Besides or instead of the IMU 318, the AUV may include a compass 320 and other sensors 322 such as, for example, an altimeter for measuring its altitude, a pressure gauge, an interrogator module, etc. The AUV 300 may optionally include an obstacle avoidance system 324 and a communication device 326 (e.g., Wi-Fi) or other data transfer device capable of wirelessly transferring seismic data. In one embodiment, the transfer of seismic data takes place while the AUV is on the vessel. Also, it is possible that the communication device 326 is a port wire-connected to the vessel to transfer the seismic data. One or more of these elements may be linked to the processor 308. The AUV further includes an antenna 328 (which may be flush with the body of the AUV) and a corresponding acoustic system 330 for communicating with the deploying, recovery or shooting vessel. Stabilizing fins and/or wings 332 for guiding the AUV to the desired position may be used together with the propulsion system 303 for steering the AUV. However, in one embodiment, the AUV has no fins or wings. The AUV may include a buoyancy system 334 for controlling the depth of the AUV, as will be discussed later.

The acoustic system 330 may be an acoustic modem, i.e., a device capable of receiving acoustic waves and translating them into electrical signals and vice versa. Alternatively or in addition, the acoustic system may include an Ultra-Short Baseline (USBL) system, also sometimes known as Super Short Base Line (SSBL). This system uses a method of underwater acoustic positioning. A complete USBL system includes a transceiver, which is mounted on a pole under a vessel, and a transponder/responder on the AUV. The processor is used to calculate a position from the ranges and bearings measured by the transceiver. For example, an acoustic pulse is transmitted by the transceiver and detected by the subsea transponder, which replies with its own acoustic pulse. This return pulse is detected by the transceiver on the vessel. The time from transmission of the initial acoustic pulse until the reply is detected is measured by the USBL system and converted into a range. To calculate a subsea position, the USBL calculates both a range and an angle from the transceiver to the subsea AUV. Angles are measured by the transceiver, which contains an array of transducers. The transceiver head normally contains three or more transducers separated by a baseline of, e.g., 10 cm or less.

With regard to the AUV's shape, one possible shape is like a submarine. However, this shape may have various cross-sections. For example, a cross-section of the AUV may be circular. In one exemplary embodiment, the cross-section of the AUV is close to a triangle. More specifically, the cross-section may be a triangle with round corners. This shape (triangular-like shape) may be advantageous when deploying or recovering the AUV on the vessel. For example, the launching (and/or recovery) device of the vessel may have a similar triangular shape and also rolling elements configured to rotate so that the AUV is lifted from the water into the vessel or lowered from the vessel into the sea. The rolling elements may be located on the launching device so there is enough contact with the AUV that the AUV does not slip downward when the rolling elements push the AUV upward. Other shapes may be imagined that could be handled by a launching device.

As discussed above, communication between the AUV and a vessel (deployment, recovery or shooting vessel) may take place using acoustic waves. According to an exemplary embodiment, an acoustic underwater positioning and navigation (AUPN) system may be used. The AUPN system may be installed on any one of the participating vessels and may communicate with the acoustic system 330 of the AUV.

The AUPN system may exhibit high accuracy and long-range performance in both positioning and telemetry modes. These features are obtained due to the automatic beam forming transducers which focus the sensitivity toward its targets or transponders. This beam can not only be pointed in any direction below the vessel, but also horizontally and even upward to the surface because the transducer is sphere-shaped.

Thus, the AUPN is a hydro-acoustic Super Short Base Line—SSBL or USBL—tow tracking system, able to operate in shallow and deepwater areas to proven ranges in excess of 3,000 meters. It is a multi-purpose system used for a wide range of applications, including towfish and towed platform tracking, high-accuracy subsea positioning and telemetry and scientific research.

The AUPN is used to determine the AUV position. In one embodiment, the AUV's actual position is measured with the AUPN and then provided to the AUV, while moving to its desired position, to correct its INS trajectory.

Figure 5:
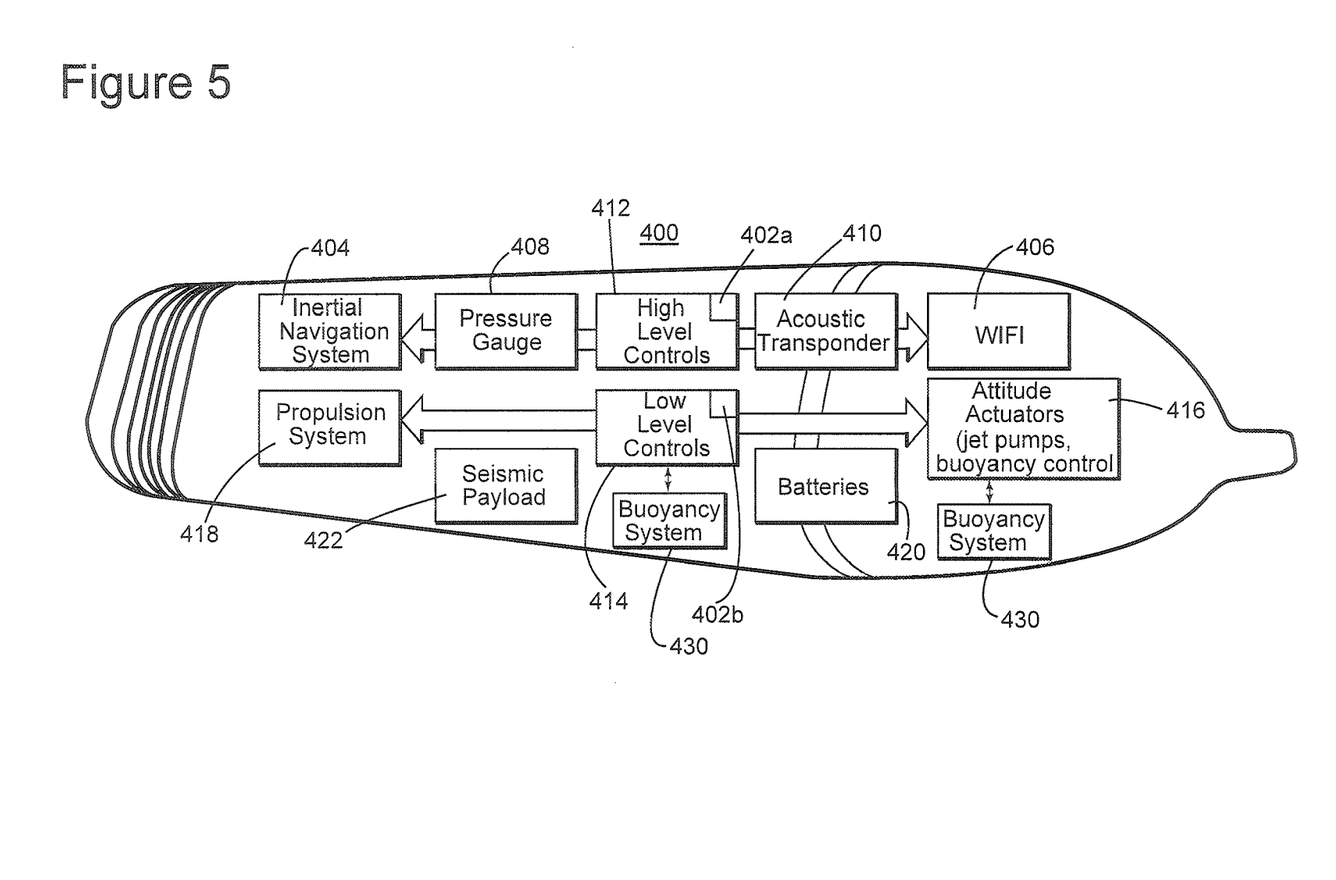
FIG. 5 is another schematic diagram of an AUV.

With regard to the internal configuration of the AUV, a possible arrangement is shown in FIG. 5, which shows an AUV 400 having a CPU 402a that is connected to IMU 404 (or compass or altitude sensor and acoustic transmitter for receiving acoustic guidance from the mother vessel), wireless interface 406, pressure gauge 408 and transponder 410. The CPU 402a may be located in a high-level control block 412. Note that the AUV 400 may reach a depth of 300 m, for example, using the buoyancy system 430 (to be described in FIG. 6). A CPU 402b, in addition to the CPU 402a, may be part of a low-level control module 414 configured to control attitude actuators 416 and the propulsion system 418. One or more batteries 420 may be located in the AUV 400. A seismic payload 422 is located inside the AUV for recording the seismic signals. Those skilled in the art would appreciate that more modules may be added to the AUV. For example, if a sensor is provided outside the AUV's body, a skirt may be provided around or next to the sensor. A water pump may pump water from the skirt to achieve a suction effect so that a good coupling between the sensor and the seabed is achieved. However, there are embodiments where no coupling with the seabed is desired. For those embodiments, no skirt is used.

Figure 6:
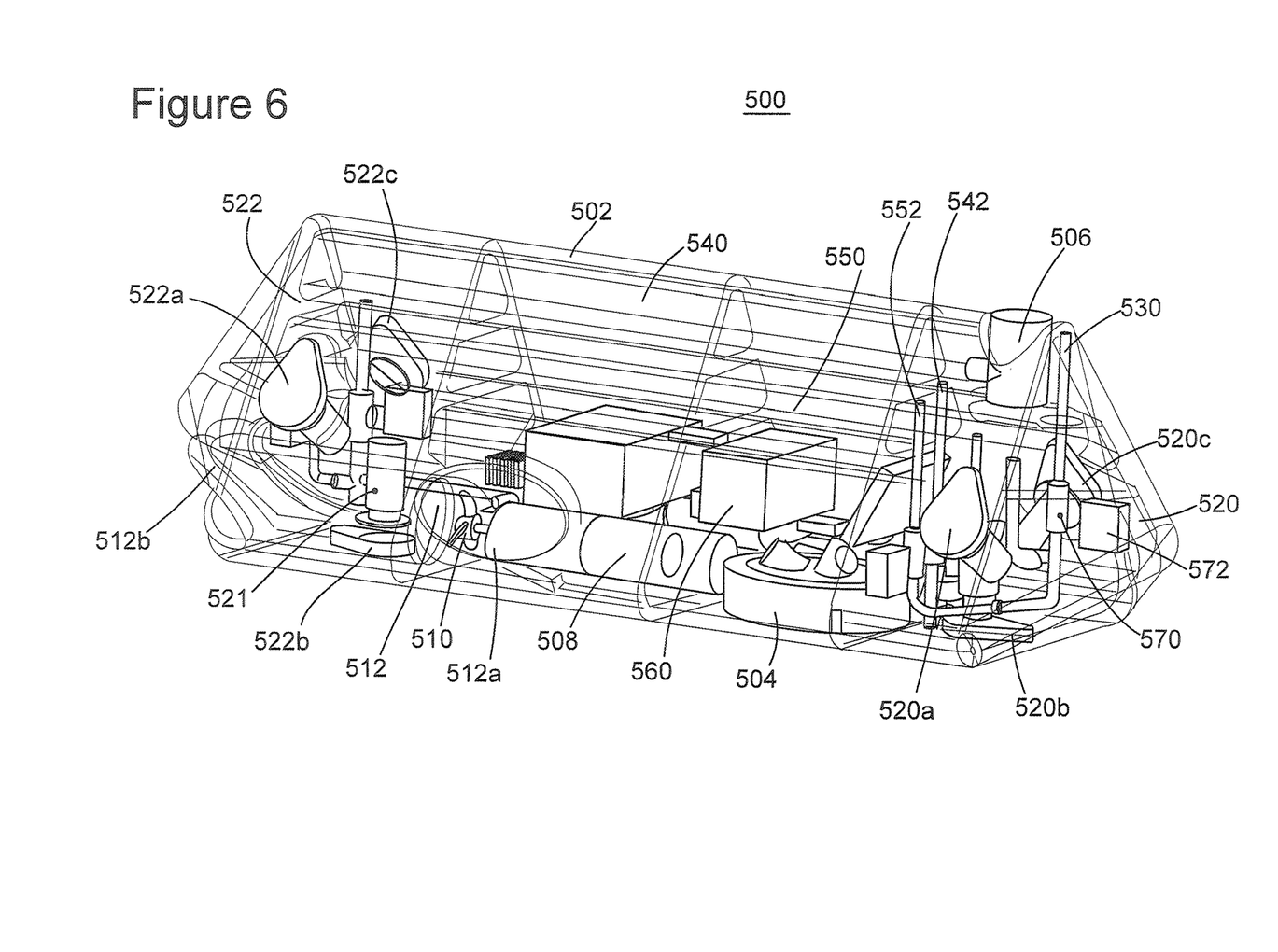
FIG. 6 is a further schematic diagram of an AUV.

Next, an AUV 500 having a buoyancy system that includes two chambers that may be flooded is described with regard to FIG. 6. The AUV 500 has a body 502 with a triangular-like shape. The body may be shaped differently. The body 502 includes a payload 504 (e.g., seismic sensors as discussed above) and an acoustic transceiver 506 (e.g., an acoustic modem) that may partially extend outside the body 502. The acoustic transceiver 506 is configured to communicate with the vessel and receive acoustic guidance (e.g., acoustic signals from the transducers of the vessel) while traveling toward a desired target point. Alternatively or in addition, the IMU may be used for guidance. Many of the devices discussed in the above embodiments may be present inside the body but, for simplicity, are neither shown nor discussed with regard to this figure.

FIG. 6 also shows a motor 508 configured to rotate a propeller 510 for providing thrust to the AUV 500. One or more motors and corresponding propellers may be used. The propeller 510 receives water through a channel 512 formed in the body 502. The channel 512 has two openings 512a (intake water element) and 512b (propulsion nozzle) that communicate with the ambient water. The two openings may be located on the nose, tail or sides of the body 502.

Guidance nozzles or turbines may be provided at the nose 520 and/or the tail 522 of the body 502 for rotation and/or translation control. For simplicity, the guidance nozzles and turbines are identified by the same reference numbers and are used interchangeably herein, although FIG. 6 shows actual turbines. Three guidance nozzles 520a-c may be located at the nose 520, and three guidance nozzles 522a-c may be located at the tail 522 of the body 502. The nozzles are connected by piping to corresponding water pumps 521. If turbines are used, no water pumps are necessary. These water pumps may be used to take in water through various vents (not shown) and guide the water through one or more of the guidance nozzles at desired speeds. Alternatively, the water pumps may take in the water at one guidance nozzle and expel the water at the other nozzle or nozzles. Thus, according to this exemplary embodiment, the AUV has the capability to adjust the position of its nose with the guidance nozzles (or turbines) 520a-c and the position of its tail with the guidance nozzles (or turbines) 522a-c. However, in other embodiments, only the tail nozzles or only the nose nozzles may be implemented.

FIG. 6 also shows chambers 540 and 550 that communicate through piping 542 and 552 and vents 530 with the ambient water so that the chambers may be flooded when desired. A control unit 560 may instruct the water pump to provide water into one or more of the chambers 540 and 550 (to partially or fully flood them) so that the AUV's buoyancy becomes neutral or negative. The same control unit 560 can instruct the water pump (or use another mechanism) to eject the water from one or more chambers so the AUV's buoyancy becomes positive. Alternatively, the control unit 560 instructs one or more actuators 570 to fluidly connect the vent 530 to the flooding chamber for making the AUV's buoyancy negative. For making the buoyancy positive, the control unit 560 may instruct a compressed gas tank 572 to provide compressed gas (e.g., air, $CO_2$, etc.) to the flooding chambers to expel the water, and then the actuator (e.g., valves) 570 seals closed the emptied flooding chambers.

Figure 7:
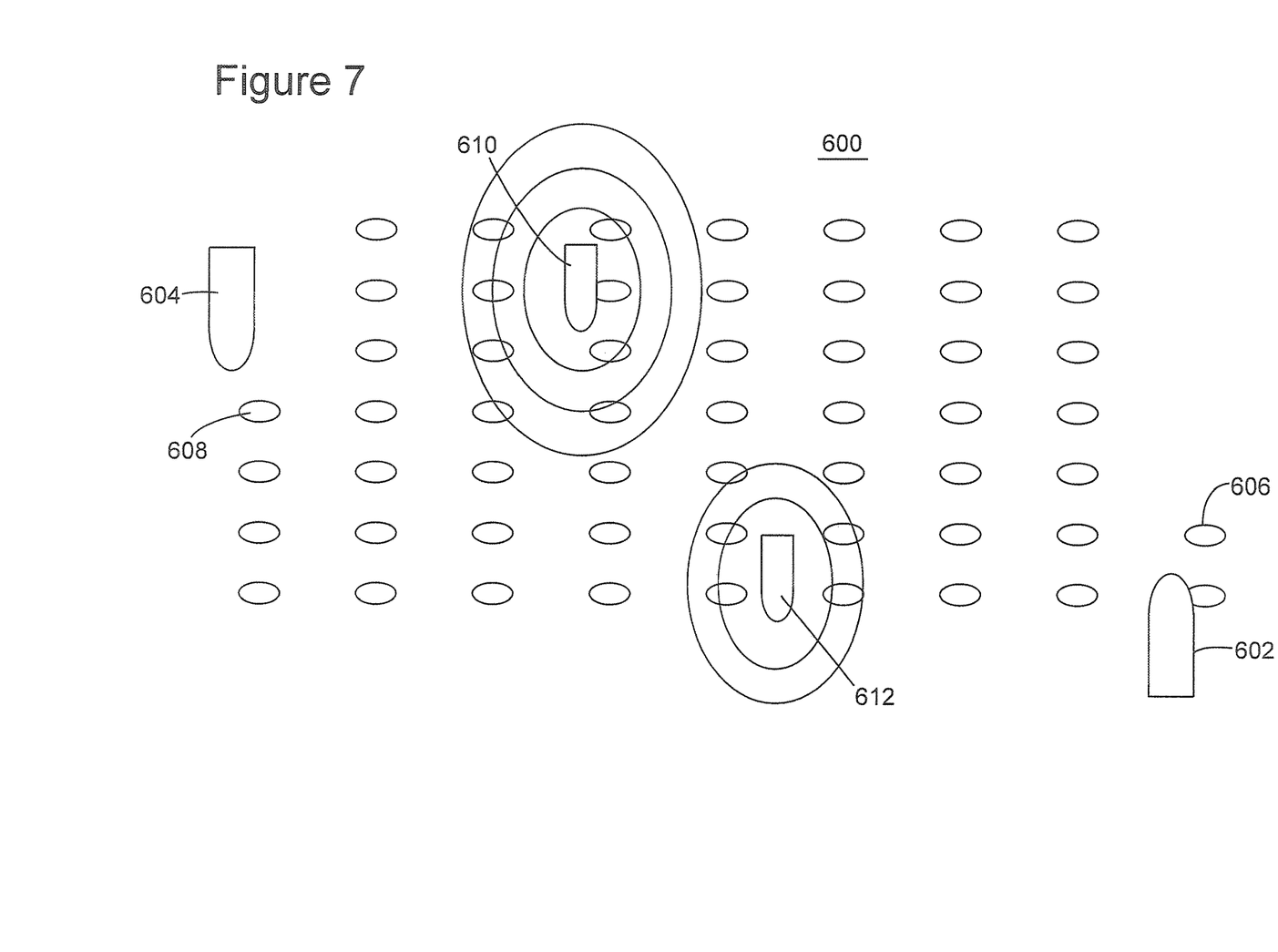
FIG. 7 is a schematic diagram of a marine seismic survey system.

An embodiment for deploying and retrieving AUVs is now discussed with regard to FIG. 7. FIG. 7 shows a seismic system 600 that includes a deployment vessel 602 and a recovery vessel 604. The deployment vessel 602 is tasked with deploying AUVs 606 while the recovery vessel 604 is tasked with recovering AUVs 608. The AUV 606 may be any one of those discussed above. In this embodiment, dedicated shooting vessels 610 and 612 follow their own paths and generate acoustic waves. In one application, the deployment and recovery vessels do not tow source arrays. Although FIG. 6 shows two shooting vessels, those skilled in the art would appreciate that one or more than two shooting vessels may be used. In another application, the deployment and recovery vessels operate continuously. When the deployment vessel is empty, it switches positions with the recovery vessel. Shooting of the sources may continue while the deployment and recovery vessels switch positions.

The deploying and recovery processes discussed above are just some examples for illustrating the novel concepts of using AUVs for seismic data recording. Those skilled in the art would appreciate that these processes may be changed, adjusted or modified to fit various needs.

Figure 8:
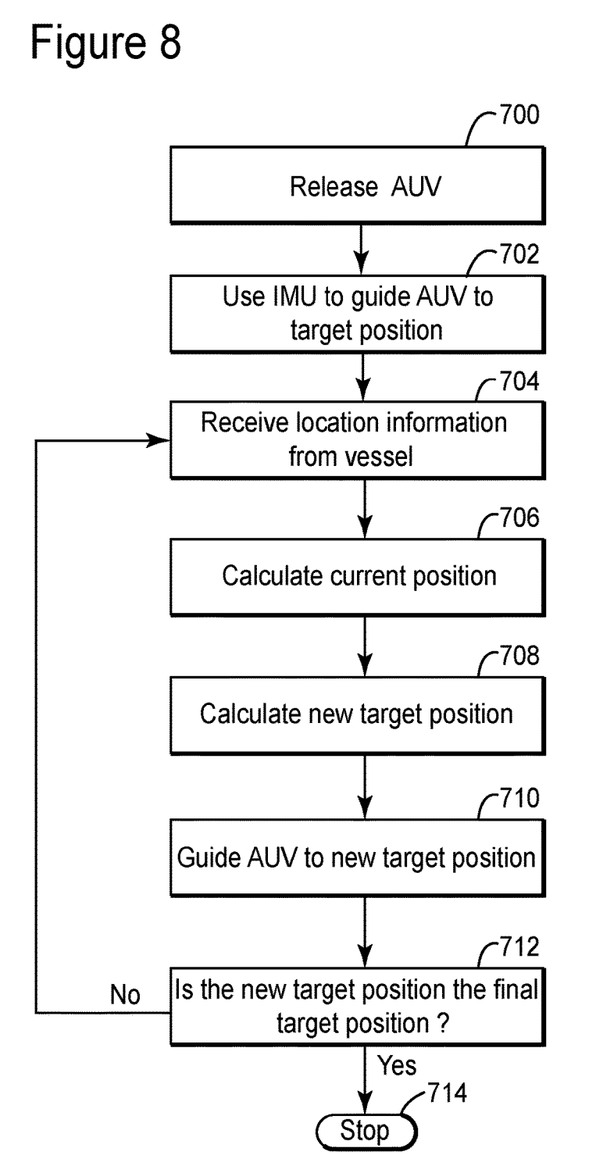
FIG. 8 is a flowchart of a method for guiding an AUV to a final target on the seafloor according to an exemplary embodiment.

According to an exemplary embodiment illustrated in FIG. 8, there is a method for guiding an AUV to a final target position and for recording seismic data when the AUV has landed on the seafloor. The method includes a step 700 of releasing the AUV in water. Because the AUV needs some time to acquire signals from the transducers and to calculate its current position, the IMU (or an equivalent navigation system) may be used in step 702 to guide the AUV to a first target position. Note that the AUV has a single final target position and multiple intermediary target positions along its path. After receiving the signals from the transducers in step 704, the AUV's processor calculates its current position in step 706. Based on the calculated current position, the AUV's processor further calculates a second target position and uses this position to guide the AUV to the second target position. If the second target position is not the final one, steps 704 to 710 are repeated until the AUV reaches its final target position. After reaching its final target position, the AUV is ready to record seismic data. After a predetermined time or when a wake-up signal is received from the vessel, the AUV resurfaces. The path to the surface may be calculated in a similar way to the path to the sea-floor, i.e., by communicating with the recovery vessel for determining its current position.

One or more of the exemplary embodiments discussed above disclose an AUV configured to arrive at a target position and record seismic data. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An autonomous underwater vehicle (AUV) for recording seismic signals during a marine seismic survey, the AUV comprising:
   a communication device configured to acoustically receive location information from plural transducers of a vessel, wherein each transducer of the vessel transmits its own geographical location;
   a navigation system configured to receive the location information from the communication device and to calculate current and target positions of the AUV based on the location information;
   a propulsion system configured to drive the AUV from the current position to the target position; and
   a seismic sensor for recording seismic data after reaching a final target position.

2. The AUV of claim 1, wherein the navigation system calculates the current position based on the location information received from the transducers.

3. The AUV of claim 2, wherein the navigation system calculates the target position based on the current position and the final target position.

4. The AUV of claim 1, wherein the geographical location of each transducer is measured by a global positioning system (GPS) mounted on the vessel and adjusted to take into consideration a relative distance between each transducer and the location of the GPS.

5. The AUV of claim 4, wherein the geographical location of each transducer is further adjusted to correspond to a future time.

6. The AUV of claim 5, wherein the future time is a sum of a current time and half of a length of a signal transmitted by a transducer.

7. The AUV of claim 1, wherein the communication device receives one by one the location information from the plural transducers.

8. The AUV of claim 7, wherein a signal from a single transducer lasts about 500 ms.

9. The AUV of claim 8, wherein a time gap between two consecutive signals received by the communication device is about 500 ms.

10. A seismic system for performing a seismic survey, the seismic system comprising:
    a vessel having plural transducers configured to send location information in the water; and
    at least one autonomous underwater vehicle (AUV) for recording seismic signals during the marine seismic survey, the at least one AUV comprising:
    a communication device configured to acoustically receive the location information from the plural transducers of the vessel, wherein each transducer of the vessel transmits its own geographical location,
    a navigation system configured to receive the location information from the communication device and to calculate current and target positions of the AUV based on the location information,
    a propulsion system configured to drive the AUV from the current position to the target position, and
    a seismic sensor for recording seismic data after reaching a final target position.

11. The system of claim 10, wherein the navigation system calculates the current position based on the location information received from the transducers.

12. The system of claim 11, wherein the navigation system calculates the target position based on the current position and the final target position.

13. The system of claim 10, wherein the geographical location of each transducer is measured by a global positioning system (GPS) mounted on the vessel and adjusted to take into consideration a relative distance between each transducer and the location of the GPS.

14. The system of claim 13, wherein the geographical location of each transducer is further adjusted to correspond to a future time.

15. The system of claim 14, wherein the future time is a sum of a current time and half of a length of a signal transmitted by a transducer.

16. The system of claim 10, wherein the communication device receives one by one the location information from the plural transducers, wherein a signal from a single transducer lasts about 500 ms, and wherein a time gap between two consecutive signals received by the communication device is about 500 ms.

17. A method for guiding an autonomous underwater vehicle (AUV) to a final target on the sea floor, the method comprising:
    releasing from a vessel the AUV in the water;
    using a navigation system of the AUV to guide the AUV from a current position to a target position;
    receiving at a communication device of the AUV, while traveling from the current position to the target position, location information from plural transducers mounted on a vessel, wherein the location information is related to a location of the vessel;
    calculating with a processor of the AUV, based on the location information, an updated current position of the AUV;
    using the navigation system and the updated current position to calculate a new target position of the AUV; and
    guiding the AUV to the new target position.

18. The method of claim 17, further comprising:
    calculating the current position based on the location information received from the transducers and
    calculating the target position based on the current position and a given final target position.

19. The method of claim 17, further comprising:
    measuring the geographical location of each transducer with a global positioning system (GPS) mounted on the vessel; and adjusting the geographical location to take into consideration a relative distance between each transducer and the location of the GPS.

20. The method of claim 19, further comprising:

further adjusting the geographical location of each transducer to correspond to a future time, wherein the future time is a sum of a current time and half of a length of a signal transmitted by a transducer.

* * * * *